US00RE35769E

United States Patent [19]

Grime et al.

[11] E Patent Number: Re. 35,769

[45] Reissued Date of Patent: Apr. 14, 1998

[54] SPRAY GUN HAVING TRIGGER OVERTRAVEL PROTECTION AND MAXIMUM FLOW ADJUSTMENT KNOB WARNING

[75] Inventors: Thomas E. Grime, Temperance, Mich.; Roger T. Cedoz, Curtice, Ohio; Roger D. Wheeler, Holland, Ohio; John F. Schaupp, Toledo, Ohio

[73] Assignee: Ransburg Corporation, Indianapolis, Ind.

[21] Appl. No.: 609,882

[22] Filed: Mar. 1, 1996

Related U.S. Patent Documents

Reissue of:

[64] Patent No.: 5,289,974
Issued: Mar. 1, 1994
Appl. No.: 48,268
Filed: Apr. 14, 1993

U.S. Applications:

[63] Continuation-in-part of Ser. No. 894,730, May 27, 1992, Pat. No. 5,236,129.

[51] Int. Cl.[6] ..... B05B 7/02

[52] U.S. Cl. ..... 239/72; 239/71; 239/528; 239/583

[58] Field of Search ..... 239/525, 536, 239/290, 296, DIG. 14

[56] References Cited

U.S. PATENT DOCUMENTS

| | | | |
|---|---|---|---|
| 1,706,875 | 3/1929 | Downs | 239/72 |
| 1,958,730 | 5/1934 | Tracy | 239/52.6 |
| 1,962,911 | 6/1934 | Roselund | 239/526 |
| 2,564,896 | 8/1951 | Gustaffson et al. | 299/140 |
| 2,879,947 | 3/1959 | Siefen | 239/411 |
| 2,991,940 | 7/1961 | Dupler et al. | 239/125 |
| 3,396,911 | 8/1968 | Norris | 239/290 |
| 3,786,683 | 1/1974 | Berman et al. | 222/79 |
| 3,786,990 | 1/1974 | Hagfors | 239/112 |
| 4,154,403 | 5/1979 | Forrester | 239/72 |
| 4,959,159 | 9/1990 | Mattson | 239/526 |
| 5,050,804 | 9/1991 | Svendsen et al. | 239/528 |
| 5,123,598 | 6/1992 | Courtney | 239/526 X |
| 5,267,693 | 12/1993 | Dickey | 239/526 X |

FOREIGN PATENT DOCUMENTS

| | | |
|---|---|---|
| 3617424 | 11/1987 | Germany . |
| 424777 | 2/1935 | United Kingdom . |

*Primary Examiner*—Kevin Weldon
*Attorney, Agent, or Firm*—MacMillan, Sobanski & Todd

[57] ABSTRACT

An improved hand held spray gun. The spray gun includes at least one manual trigger which when squeezed moves a valve needle to initiate fluid flow. A knob is provided to adjust the maximum fluid flow when the trigger is squeezed. When the trigger is released, a compression spring returns the valve needle to its closed position. An over travel spring is compressed only if an excessive force is applied to the trigger to prevent damage to the spray gun. The over travel spring is stronger than the valve needle return spring so that it compresses only after the spray gun is fully on. If the maximum fluid flow adjustment knob is turned too far, compressed air is vented through the knob as a tactile warning to the spray gun operator to not turn the knob further. The vented air also may whistle to provide an audible warning that the knob should not be turned further.

12 Claims, 2 Drawing Sheets

SPRAY GUN HAVING TRIGGER OVERTRAVEL PROTECTION AND MAXIMUM FLOW ADJUSTMENT KNOB WARNING

Matter enclosed in heavy brackets [ ] appears in the original patent but forms no part of this reissue specification; matter printed in italics indicates the additions made by reissue.

CROSS REFERENCE TO RELATED APPLICATION

This is a continuation-in-part of copending U.S. patent application Ser. No. 07/894,730 filed May 27, 1992, now U.S. Pat. No. 5,236,129.

TECHNICAL FIELD

The invention relates to hand held spray guns and more particularly to an improved fluid control for a hand held spray gun which included protection against damage from over travel of a trigger and has a novel control knob for adjusting maximum fluid flow.

BACKGROUND ART

A typical prior art hand held paint spray gun includes a gun body having a nozzle assembly mounted on one end and having a handle depending from adjacent an opposite end. A trigger is attached to the gun body to pivot towards and away from the handle. When an operator holds the gun by the handle and squeezes the trigger, an air valve is opened and then a valve needle is moved to open a fluid valve. The air valve supplies any air required for atomization and for shaping the spray pattern. If the trigger is only partially squeezed, the fluid valve may be only partially opened to permit the operator to apply a lighter coating, for example, for feathering when touching up a coating. The spray gun also includes an adjustable stop which limits trigger travel to adjust the maximum paint flow from the gun when the trigger is fully squeezed. Trigger travel may be limited either by a direct adjustable stop for the trigger or indirectly by limiting the maximum linear movement of the valve needle.

Fluid flow is typically adjusted by rotating a knob on the back of the gun body. When the fully triggered fluid flow from a spray gun is adjusted to less than the maximum flow the trigger will stop short of the spray gun handle when it is squeezed. In some cases, if an operator squeezes the trigger too hard, the gun will be damaged. In order to reduce the risk of damage to the gun from squeezing the trigger too hard, the gun components must be designed to be stronger than is required for normal operation. The stronger gun components add weight to the gun, which in turn will increase operator fatigue. It has not been possible to construct prior art commercial quality spray guns from lighter weight materials such as plastics without risk of failure.

DISCLOSURE OF INVENTION

The invention is directed to an improved fluid control for a hand held spray gun which includes protection against damage from over travel of a trigger and has a novel control for maximum fluid flow. The spray gun includes a mechanism for linearly moving a fluid needle in the gun body when the trigger is squeezed. A return spring moves the valve needle to a closed position and moves the trigger away from the gun handle when the trigger is released. An adjustable stop limits the maximum valve needle movement to limit the maximum paint flow from the gun when the trigger is fully squeezed during normal operation. When the trigger is squeezed for the maximum set paint flow, it typically is spaced from the gun handle by a distance which will vary with the flow adjustment setting. The arc over which the trigger can be pivoted is varied when the maximum paint flow is adjusted. A second, over travel spring is provided which is stronger than the trigger return spring. When the trigger is squeezed for maximum paint flow and an excessive force is applied to the trigger, the second spring will compress, allowing the trigger to pivot into contact with the gun handle, without damage to the gun.

The maximum paint flow rate from the spray gun is set by a knob threaded into the rear end of a gun body. In one gun design, the internal end of the knob is exposed to compressed air. According to a second feature of the invention, a vent opening is provided through the knob. If the knob is turned more then a predetermined amount, air will begin to flow through the vent opening. The operator may feel the air flow on his or her hand as the knob is rotated, thus indicating that the knob should not be turned further. The vent opening may be designed to whistle when air flows through the opening to audibly alert the operator that the knob should not be turned further. If the gun includes a pneumatically controlled triggering mechanism, the venting of air through the adjustment knob also may turn the gun on to alert the operator that the knob has been turned too far. By providing an indication of when the fluid flow adjustment knob has been unscrewed past the maximum fluid flow setting, the risk of unscrewing the knob too far is reduced.

Accordingly, it is an object of the invention to provide an improved triggering arrangement for a paint spray gun to prevent damage to the gun.

Other objects and advantages of the invention will become apparent from the following detailed description of the invention and the accompanying drawings.

BEST MODE FOR CARRYING OUT THE INVENTION

Figure 1:
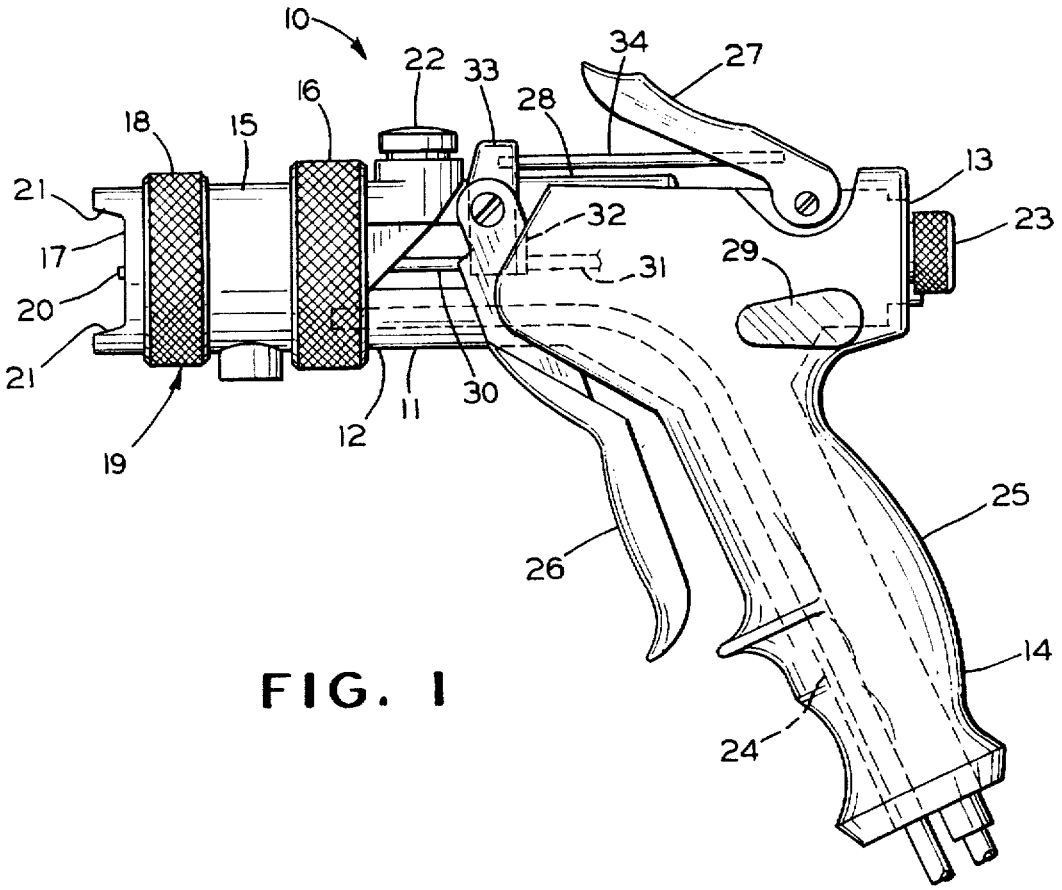
FIG. 1 is a side elevational view of a hand held paint spray gun according to one embodiment of the invention.

Referring now to FIG. 1 of the drawings, a paint spray gun 10 is shown according to one embodiment of the invention. The spray gun 10 generally includes a gun body 11 having a front end 12 and a rear end 13, a handle 14 depending from adjacent the rear end 13, a fluid tip 15 secured to the front end 12 by a retainer ring 16 and an air cap 17 secured to the fluid tip 15 by a retainer ring 18. The fluid tip 15 and the air cap 17 form a nozzle assembly 19 for discharging and atomizing paint or other coating fluids. The paint is discharged from an orifice 20 and atomized by a surrounding flow of atomization air in a conventional manner. Optionally, pattern shaping air may be directed at opposite sides of the envelope of atomized paint from air horns 21 on the air cap to flatten the atomized paint envelope into a fan shaped pattern in a known manner. A manually adjusted valve 22 is located adjacent the front body end 12 for adjusting the flow of pattern shaping air to select a desired pattern ranging from a round spray pattern to a maximum flattened or fan shaped spray pattern. As will be discussed in greater detail below, a knob 23 extends from the rear body end 13 for adjusting the maximum flow of paint or other coating fluid.

Figure 2:
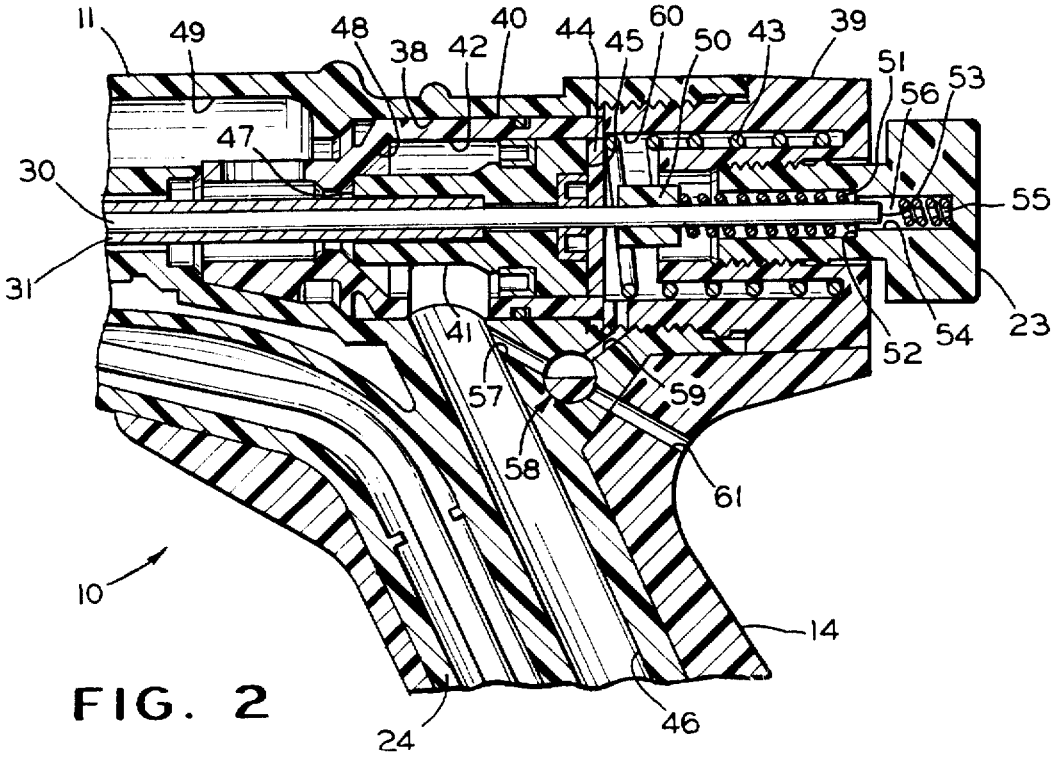
FIG. 2 is an enlarged fragmentary vertical cross sectional view through the rear portion of the spray gun body and the upper portion of the handle for the spray gun of FIG. 1.

The gun handle 14 may consist of a frame 24 which is integrally formed with the gun body 11 and a contoured cover 25 which extends over the frame 24. In the illustrated gun 10, a main trigger 26 is secured to the gun body 11 to pivot towards and away from the handle 14. An optional auxiliary trigger 27 may be mounted on a top 28 of the gun body 11 to pivot towards and away from the gun body 11. The gun 10 also may be provided with a low force pneumatic trigger which is operated, for example, by a thumb actuated button 29. Squeezing either trigger 26 or 27 mechanically moves a valve needle 30 to initiate the discharge of paint from the orifice 20, while actuating the button 29 operates a pneumatic piston 41 to open the valve needle 30. As shown in FIGS. 1 and 2, the valve needle 30 extends through a tube 31 and a bar 32. When the main trigger 26 is squeezed, an actuator arm 33 is rotated to push on the bar 32 and in turn push the tube 31 towards the rear end 13 of the gun body 11 for moving the valve needle 30. When the auxiliary trigger 27 is squeezed, a rod 34 moves in an axial direction to also rotate the actuator arm 33 for moving the valve needle 30.

FIG. 2 is an enlarged fragmentary cross sectional view showing details of the mechanism for triggering the spray gun 10. An opening 38 is formed in the rear end 13 of the gun body 11. The opening 38 is closed by a cap 39 which is threaded into the opening 38 and by the maximum fluid flow adjustment knob 23 which is threaded into the cap 39. The cap 39 holds an insert 40 in the opening 38. The piston 41 is mounted to slide in a cylinder 42 formed by the insert 40. A piston return spring 43 is compressed between the cap 39 and a bearing plate 44 on an end 45 of the piston 41. The tube 31 extends between the bar 32 and the piston 41. Consequently, when either of the triggers 26 or 27 is squeezed, the tube 31 pushes the piston towards the knob 23, compressing the spring 43. Compressed air is supplied from an external source (not shown), such as an air compressor and connecting hoses, to a passage 46 in the gun handle 14. Normally, an end 47 on the piston 41 seats against a conical surface 48 on the insert 40 to block the flow of air from the passage 46 to an air passage 49 in the gun body 11 which delivers the compressed air to the nozzle assembly 19 (FIG. 1). When the piston 41 is moved towards the knob 23, the resulting gap between the piston surface 47 and the insert surface 48 allows the compressed air to flow from the passage 46 through the passage 49 to the nozzle assembly 19. Thus, the piston 41 and the insert 40 form an air flow control valve.

The tube 31 and the piston 41 are coaxial with and slide on the valve needle 30. A collar 50 is secured to the valve needle 30 at a location slightly spaced from the bearing plate 44 when the piston 41 is seated against the insert 40. After the piston 41 is moved towards the knob 23 to initiate air flow to the nozzle assembly 19, the bearing plate 44 contacts the collar 50 and further movement of the piston 41 moves the valve needle 30 towards the knob 23 to initiate fluid discharge from the orifice 20 (FIG. 1). As the valve needle 30 is moved towards the knob 23, a return spring 51 is compressed between the collar 50 and a shoulder 52 on the knob 23. When a squeezed trigger 26 or 27 is released, the spring 51 returns the valve needle 30 to its normally closed position to interrupt fluid flow and the spring 43 returns the piston 41 to its normal position wherein the flow of atomization and pattern shaping air is interrupted.

The valve needle 30 has an end 53 which extends into a closed bore 54 in the maximum fluid flow adjustment knob 23. According to the invention, a short stiff helical compression spring 55 is located in the bore 54. When the spray gun 10 is off, there is at least one gap or space 56 between the valve needle end 53 and the spring 55 and the knob 23. When either trigger 26 or 27 is squeezed to its set full flow limit, the ends of the spring 55 contact the valve needle end 53 and the end of the closed bore 54. The size of the space 56 when the spay gun 10 is off is determined by how far the knob 23 is screwed into the cap 39. A greater size to the space 56 means the valve needle 30 may open further for a higher maximum flow rate when the gun 10 is fully triggered, while a reduced size to the space 56 reduces the maximum paint flow. As the maximum paint flow is reduced, the trigger 26 will be spaced further from the gun handle 14 when fully triggered and the trigger 27 will be spaced further from the top 28 of the gun body 11 when fully triggered. The spring 55 is appreciable heavier than the combined forces of the springs 43 and 51 to form a positive stop for the valve needle 30. However, according to the invention, the spring 55 is designed to yield before the gun 10 is damaged when excessive force is applied to either trigger 26 or 27.

The spray gun 10 also may include apparatus for pneumatically triggering the paint flow. The compressed air in the passage 46 also is normally free to flow through a passage 57, a valve 58 and a passage 59 to a chamber 60 between the piston 41 and the cap 39. Consequently, the air pressure is balanced on both sides of the piston 41. When the button 29 is rotated, the valve 58 blocks the passage 57 and vents the chamber 60 and the passage 59 through a passage 61 to atmosphere. The resulting pressure drop across the piston 41 is sufficient to move the piston 41 to fully turn on the spray gun 10. However, the force is not sufficiently high to compress the spring 55.

Figure 3:
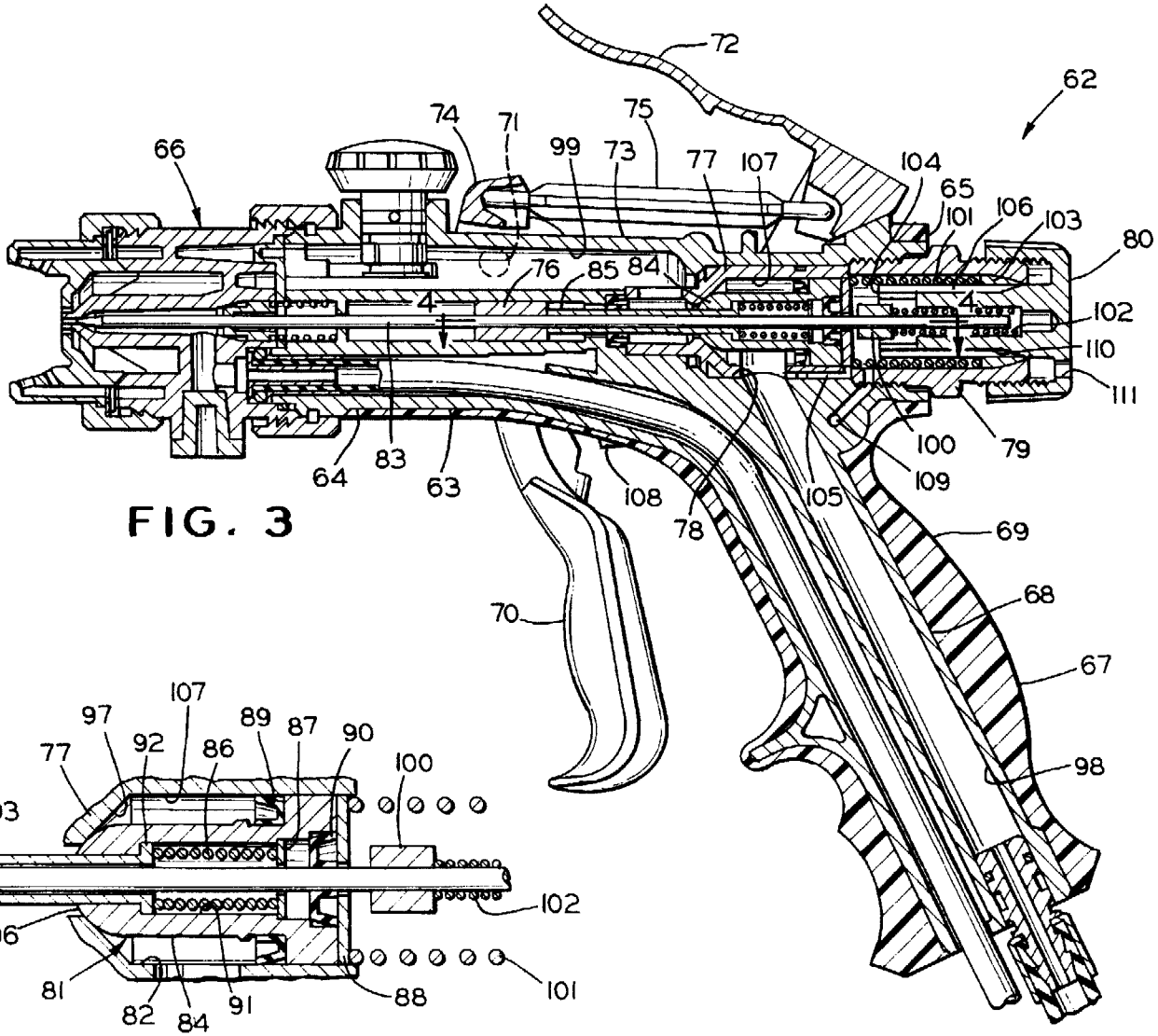
FIG. 3 is a vertical cross sectional view through a hand held paint spray gun according to a second embodiment of the invention.
Figure 4:
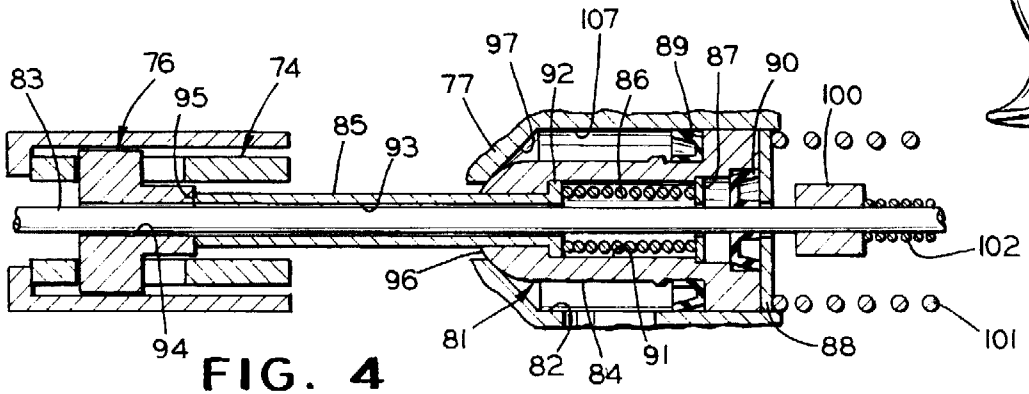
FIG. 4 is an enlarged fragmentary cross sectional view as taken along line 4—4 of FIG. 3.

FIGS. 3 and 4 illustrate a spray gun 62 according to a modified embodiment of the invention. The spray gun 62 includes a body 63 a front end 64 and a rear end 65. A nozzle assembly 66 is secured to the front end 64 for discharging and atomizing coating fluid. A handle 67 depends from adjacent the rear body end 65. The handle 67 includes a frame 68 which is integral with the body 63 and a contoured cover 69. A main trigger 70 is secured to the body 63 to pivot on a pin 71 towards and away from the handle 67 and an optional auxiliary trigger 72 is mounted on the body 63 to pivot towards and away from a top 73 of the body 63. When the trigger 70 is squeezed, an actuator arm 74 is rotated about the axis of the pin 71. When the auxiliary trigger 72 is squeezed, a pin 75 is pushed forward towards the front body end 64 to rotate the actuator arm 74. In either event, rotation of the actuator arm 74 pushes a block 76 towards the rear body end 65 to initiate spraying, as will be discussed in detail below.

An insert 77 is located in a rear chamber 78 in the gun body 63. A cap 79 is threaded into the chamber 78 at the rear body end 65 to retain the insert 77 in the chamber 78. A maximum fluid flow adjustment knob 80 is threaded onto the cap 79. The cap 79 and the knob 80 close the chamber 78. A fluid valve needle 83 extends from the nozzle assembly 66 coaxially through a piston assembly 81 to the knob 80. The valve needle 83 is free to move relative to the piston in an axial direction and the piston assembly 81 is free to slide in a cylinder 82 formed in the insert 77. The piston assembly 81 includes a piston 84, a tube 85, a helical compression spring 86, a retainer ring 87, a bearing plate 88 and two seals 89 and 90. The tube 85 slides in an stepped axial opening 91 in the piston 84 and is retained in the stepped opening 91 by an end flange 92. The spring 86 is compressed between the tube flange 92 and the retainer ring 87. The tube 85 has an axial opening 93 sized to pass the valve needle 83. The seal 89 provides a sliding gas tight seal between the piston 84 and the cylinder 82 and the seal 90 provides a sliding gas tight seal between the piston 84 and the valve needle 83.

The valve needle 83 extends through an opening 94 in the block 76. The block 76 abuts an end 95 of the tube 85. When either of the triggers 70 or 72 is squeezed, the block 76 pushes the tube 85 towards the knob 80 at the rear end 65 of the gun body. This in turn slides the piston 84 in the cylinder 82, causing a curved forward surface 96 on the piston 84 to separate from a conical surface 97 on the insert 77. The surfaces 96 and 97 form a valve for controlling the flow of compressed air from a passage 98 in the gun handle 67 to a chamber 99 in the gun body 63. The air delivered to the chamber 99 is used for fluid atomization and for shaping the pattern of the atomized fluid.

A collar 100 is secured to the valve needle 83 a short distance from the bearing plate 88 when the spray gun 62 is off. As the spray gun 62 is triggered, the piston 84 moves to initiate air flow prior to the bearing plate 88 contacting the collar 100. As the piston 84 is moved further by squeezing on either of the triggers 70 or 72, the bearing plate 88 pushes on the collar 100 to move the valve needle 83, thereby initiating fluid discharge from the spray gun 62. When the squeezed trigger 70 or 72 is released, a compression spring 101 returns the piston assembly 81 to its normal position to interrupt air flow and to return the trigger to its released position. A compression spring 102 returns the valve needle 83 to its closed position. The compression spring 101 is compressed between a seal 103 and the bearing plate 88 and the spring 102 is compressed between the collar 100 on the valve needle 83 and the knob 80.

The knob 80 has an end 104 which serves as a stop to limit maximum movement of the valve needle 80 and the attached collar 100. The position of the knob end 104 is adjusted by rotating the knob 80 which is threaded into the cap 79. By rotating the knob 80, the maximum fluid flow from the nozzle assembly 66 is adjusted. Adjusting the knob 80 also adjusts the arc over which the trigger 70 moves to trigger the spray gun 62. When the trigger 70 is squeezed to turn the spray gun 62 fully on, the trigger 70 will be spaced from the handle 67. According to one embodiment of the invention, the spring 86 functions to prevent damage to the spray gun 62 if excessive pressure is applied to the trigger 70. If excessive pressure is applied to the trigger 70 after the bearing plate 88 abuts the knob end 104, the spring 86 will compress. This allows the trigger 70 to be squeezed until it contacts the handle 67 without causing damage to the gun 62. The spring 86 is selected to have a greater compressive force than the springs 101 and 102 combined so that the spring 86 compresses only after the bearing plate 88 contacts the knob end 104.

The spray gun 62 also may be pneumatically triggered. A small groove 105 in the insert 77 connects the compressed air passage 98 with a rear chamber 106. The chamber 106 is formed between the bearing plate 88 at the rear end of the piston assembly 81, the cap 79 and the knob 80. The compressed air is also applied to a forward chamber 107 between the piston 84 and the insert cylinder 82. So long as the rear chamber 106 is closed, equal air pressure will appear across the piston 84. If the rear chamber 106 is vented to atmosphere, the pressure drop across the piston 84 will move the piston 84 to trigger the spray gun 62. It will be apparent that various means may be provided for venting the rear chamber 106 to trigger the spray gun 62. The rear chamber 106 may be vented with a thumb actuated valve such as the valve 58 in FIG. 2. Or, the main trigger 70 may be designed to have dual operating modes and to push a valve stem 108 for venting the rear chamber 106 through a passage 109.

The spray gun 10 of FIGS. 1 and 2 was described as having a piston 41 and the spray gun 62 of FIGS. 3 and was described as having a piston assembly 81 including a piston 84. It will be appreciated that the pistons 41 and 84 are not needed if the spray guns 10 and 62 are not provided with a pneumatic triggering mechanism. In such case the piston 41 and the piston assembly 81 may be broadly considered as an actuator assembly for opening the air and fluid valves when the gun trigger is squeezed. The piston 84 is broadly a body or housing for retaining the over travel spring 86 and the flange 92 on the tube 85. It also will be appreciated that the over travel safety feature may be incorporated into an airless spray gun which uses hydrostatic fluid pressure and a shaped orifice for atomizing the fluid. In such case, the air flow valve formed by the piston 41 and the insert 40 in FIGS. 1 and 2 and formed by the piston 84 and the insert 77 in FIGS. 3 and 4 will be omitted.

As previously stated, the knob 80 is threaded into the cap 79 for adjusting the maximum fluid flow from the triggered spray gun 62. The knob 80 is not captive and may be unscrewed from the cap 79. Since the rear chamber 106 is pressurized, the air pressure may make it difficult to reinstall the knob 80 if it is accidentally unscrewed from the cap 79. According to a further aspect of the invention, a warning is provided to the operator of the spray gun 62 if the knob 80 is unscrewed too far. The piston return spring 101 presses the seal 103 into a tapered annular space between the knob 80 and the air cap 79 to prevent air pressure loss during normal operation of the spray gun 62. Normally, the seal 103 covers one or more grooves 110 in the knob 80. If the knob 80 is adjusted for maximum fluid flow and further unscrewed, the groove 110 begins to vent the chamber 106 through a hole 111 in the knob 80. The operator will feel the initial air flow as a tactile indication that the knob 80 has been unscrewed too far. Also, the air flow through the hole 111 also can be made to whistle as its velocity increases to further provide an audible warning to the spray gun operator. Finally, if the knob 80 is unscrewed further, the pressure drop in the rear chamber 106 will cause the spray gun 62 to be triggered before the knob 80 is fully unscrewed. Consequently, the risk that the knob 80 is accidentally removed is significantly reduced.

It will be appreciated that various modifications and changes may be made to the above described preferred embodiments of a hand held spray gun without departing from the spirit and the scope of the following claims.

We claim:

1. In a hand held spray gun having a fluid valve including a trigger moveable between a released position and a set maximum fluid flow position, a valve needle, means for moving said valve needle from a closed position to an open position when said trigger is moved from the released position to the set maximum fluid flow position, a return spring urging said valve needle to said closed position, and adjustable stop means for adjusting the open position of said valve needle to set the maximum fluid flow from said spray gun, said return spring compressing when said valve needle is moved to the open position, the improvement comprising an over travel compression spring having a compressive force greater than the compressive force of said return spring, and means positioning said over travel spring in said spray gun to be compressed when an excessive force is applied to said trigger to move said trigger from the released position past the set maximum fluid flow position whereby said over travel spring prevents damage to said spray gun.

2. An improved spray gun, as set forth in claim 1, wherein said valve needle has an end spaced from said stop means and wherein said over travel spring is positioned between said valve needle end and said stop means.

3. An improved spray gun, as set forth in claim 2, wherein said valve needle end, said over travel spring and said stop means are spaced to define at least one gap when said trigger is in said released position, and wherein said at least one gap doses when said trigger is moved to the set maximum fluid flow position.

4. An improved spray gun, as set forth in claim 1, and wherein said means for moving said valve needle when said trigger is moved includes said over travel spring.

5. An improved spray gun, as set forth in claim 1, and wherein said means for moving said valve needle when said trigger is moved includes an actuator assembly positioned coaxially about said valve needle, said actuator assembly including a body, a tube extending coaxially about said valve needle and said over travel spring, said body having a stepped opening and said tube having an enlarged end retained in said stepped opening and abutting an end of said compression spring, means for moving said valve needle when said body is moved towards said stop means, means for pushing said tube to move said actuator assembly in an axial direction towards said stop means in response to said trigger moving from the released position to the set maximum fluid flow position, and wherein said tube compresses said over travel spring when said trigger is moved past said set maximum fluid flow position.

6. An improved spray gun, as set forth in claim 5, and further including a compressed air valve for controlling the discharge of compressed air from said spray gun, wherein said compressed air valve includes said body and a valve seat, said body having an end contacting said valve seat to interrupt the flow of compressed air when said trigger is in the released position, and wherein said body moves away from said valve seat to initiate the flow of compressed air when said trigger is moved from the released position to the set maximum fluid flow position.

7. An improved spray gun, as set forth in claim 6, and wherein said body moves away from said valve seat to initiate the flow of compressed air prior to said means for moving said valve needle moving said valve needle to initiate the flow of fluid.

8. An improved spray gun, as set forth in claim 6, wherein a knob is threaded onto said spray gun, wherein said spray gun includes a chamber closed by said knob, means for supplying compressed air to said chamber, a normally closed vent opening in said knob, and means for venting compressed air from said chamber to said vent opening when said knob is turned a predetermined amount.

9. An improved spray gun, as set forth in claim 8, and wherein said vent opening is shaped to whistle when air is vented therethrough.

10. In a paint spray gun having a fluid valve including a trigger, a valve needle which is moved from a closed position to an open position when said trigger is squeezed, a return spring urging said valve needle to the closed position and an adjustable stop for adjusting the open position of said valve needle, the improvement comprising a compression spring positioned between an end of said valve needle and said adjustable stop, said compression spring contacting said valve needle end and said stop when said valve needle is moved by said trigger to the open position, and wherein said compression spring is appreciably stronger than said return spring whereby said compression spring is compressed only when an excessive force is applied to said trigger.

*11. In a hand held spray gun having a fluid valve including a trigger movable between a released position and a set maximum fluid flow position, a valve needle, means for moving said valve needle from a closed position to an open position when said trigger is moved from the released position to the set maximum fluid flow position, a return spring urging said valve needle to said closed position with a predetermined force, and adjustable stop means for adjusting the open position of said valve needle to set the maximum fluid flow from said spray gun, the improvement comprising an over travel spring having a spring force greater than said predetermined force of said return spring, and means positioning said over travel spring in said spray gun to be deflected when an excessive force is applied to said trigger to move said trigger from the released position past the set maximum fluid flow position whereby said over travel spring prevents damage to said spray gun from the application of an excessive trigger force.*

*12. In a paint spray gun having a fluid valve including a trigger, a valve needle which is moved from a closed position to a predetermined open position when said trigger is squeezed, a return spring exerting a predetermined force to urge said valve needle to the closed position and means for establishing the predetermined open position of said valve needle, the improvement comprising an over travel spring, and means mounting said over travel spring in said spray gun to be deflected in response to the application of an excessive force on said trigger after said valve needle has been moved to said open position whereby said over travel spring prevents damage to said spray gun from the application of an excessive trigger force.*

* * * * *